(12) United States Patent
Lin et al.

(10) Patent No.: US 7,440,194 B1
(45) Date of Patent: Oct. 21, 2008

(54) ZOOM LENS FOR USE IN PROJECTION DEVICES

(75) Inventors: Chun-Ling Lin, Taipei Hsien (TW);
Chun-Hsiang Huang, Taipei Hsien (TW); Chung Lee, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/959,247

(22) Filed: Dec. 18, 2007

(30) Foreign Application Priority Data

Sep. 24, 2007 (CN) .................. 2007 1 0201835

(51) Int. Cl.
*G02B 15/14* (2006.01)
(52) U.S. Cl. .................. 359/680; 359/682; 359/683; 359/685; 359/740; 359/770
(58) Field of Classification Search ................ 359/676, 359/680–685, 740, 770
See application file for complete search history.

(56) References Cited

U.S. PATENT DOCUMENTS

| | | | | |
|---|---|---|---|---|
| 7,079,324 B2 * | 7/2006 | Yamasaki | ................... | 359/680 |
| 7,190,528 B2 * | 3/2007 | Inoko | ................... | 359/649 |
| 2004/0190155 A1 * | 9/2004 | Nagahara | ................... | 359/680 |
| 2005/0036206 A1 * | 2/2005 | Wada | ................... | 359/676 |
| 2007/0058267 A1 | 3/2007 | Kawana | | |
| 2007/0103793 A1 * | 5/2007 | Inoko | ................... | 359/684 |

* cited by examiner

*Primary Examiner*—Evelyn A. Lester

(57) ABSTRACT

An exemplary zoom lens for use in projection technology includes, in this order from the magnification side to the minification side thereof, a first lens group having negative refraction of power, a second lens group having positive refraction of power, a third lens group having positive refraction of power, a fourth lens group having negative refraction of power, and a fifth lens group having positive refraction of power, wherein the zoom lens satisfies the formulas: $-1.5<F1/Fw<-1.3$, $1.5<F2/Fw<1.8$, $1.8<F3/Fw<2.2$, $-10<F4/Fw<-5$, and $2.3<F5/Fw<2.8$, where F1, F2, F3, F4, F5, and Fw respectively represent the effective focal length of the first lens groups, the second lens group, the third lens group, the fourth lens group, the fifth lens group, and the shortest effective focal length of the zoom lens.

11 Claims, 26 Drawing Sheets

ZOOM LENS FOR USE IN PROJECTION DEVICES

BACKGROUND

1. Technical Field

The invention relates to zoom lenses and, in particular, relates to a zoom lens for use in projection technology that is capable of maintaining image resolution at all zoom settings thereof.

2. Description of Related Art

Recently, zoom lenses are used in projectors, such as digital light processing (DLP) projectors, liquid crystal display (LCD) projectors, or liquid crystal on silicon (LCOS) projectors, to allow adjustment of effective focal length thereof to accommodate using the projectors in different spaces, e.g., a spacious hall or a narrow room. However, correcting for aberrations in such a zoom lens becomes difficult as these aberrations corrected for at one setting of the zoom lens maybe changed at another setting of the zoom lens, therefore making it difficult to ensure quality image resolution for all settings (e.g. points within a zooming range) of the zoom lens.

Therefore, it is desirable to provide a zoom lens for use in projection technology, which can overcome the above mentioned problem.

SUMMARY

In a present embodiment, a zoom lens for use in projection technology includes, in this order from the magnification side to the minification side thereof, a first lens group having negative refraction of power, a second lens group having positive refraction of power, a third lens group having positive refraction of power, a fourth lens group having negative refraction of power, and a fifth lens group having positive refraction of power, wherein the zoom lens satisfies the formulas: $-1.5 < F1/Fw < -1.3$, $1.5 < F2/Fw < 1.8$, $1.8 < F3/Fw < 2.2$, $-10 < F4/Fw < -5$, and $2.3 < F5/Fw < 2.8$, where F1, F2, F3, F4, F5, and Fw respectively represent the effective focal length of the first lens groups, the second lens group, the third lens group, the fourth lens group, the fifth lens group, and the shortest effective focal length of the zoom lens.

BRIEF DESCRIPTION OF THE DRAWINGS

Many aspects of the present zoom lens should be better understood with reference to the following drawings. The components in the drawings are not necessarily drawn to scale, the emphasis instead being placed upon clearly illustrating the principles of the present zoom lens. Moreover, in the drawings, like reference numerals designate corresponding parts throughout the several views.

DETAILED DESCRIPTION OF THE EMBODIMENTS

Figure 1:
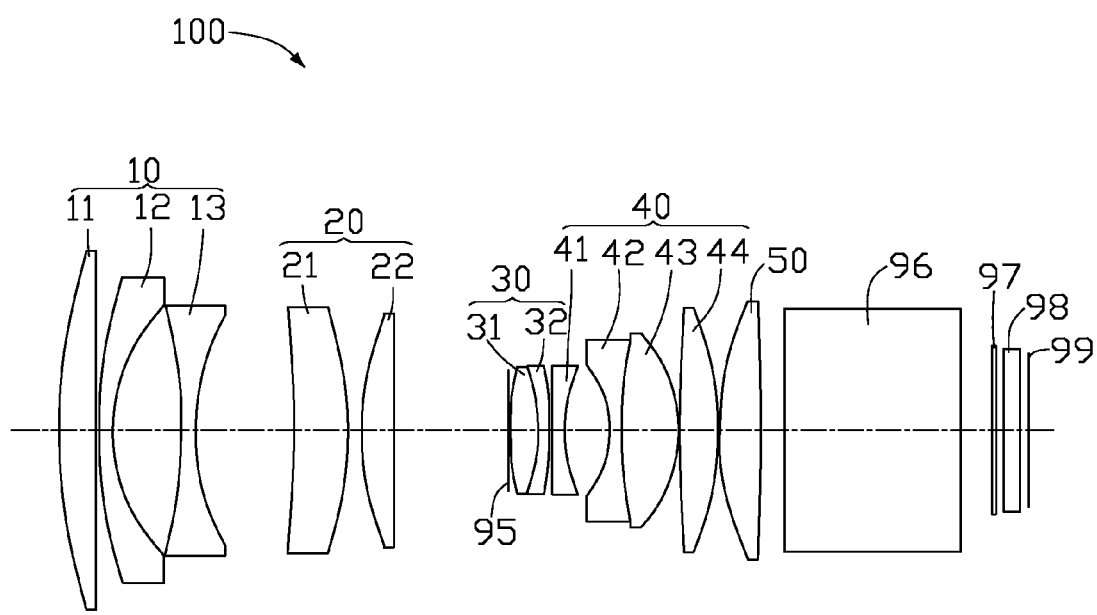
FIG. 1 is a schematic view of a zoom lens for use in projection technology, which is in a wide angle state thereof, according to a first embodiment.
Figure 2:
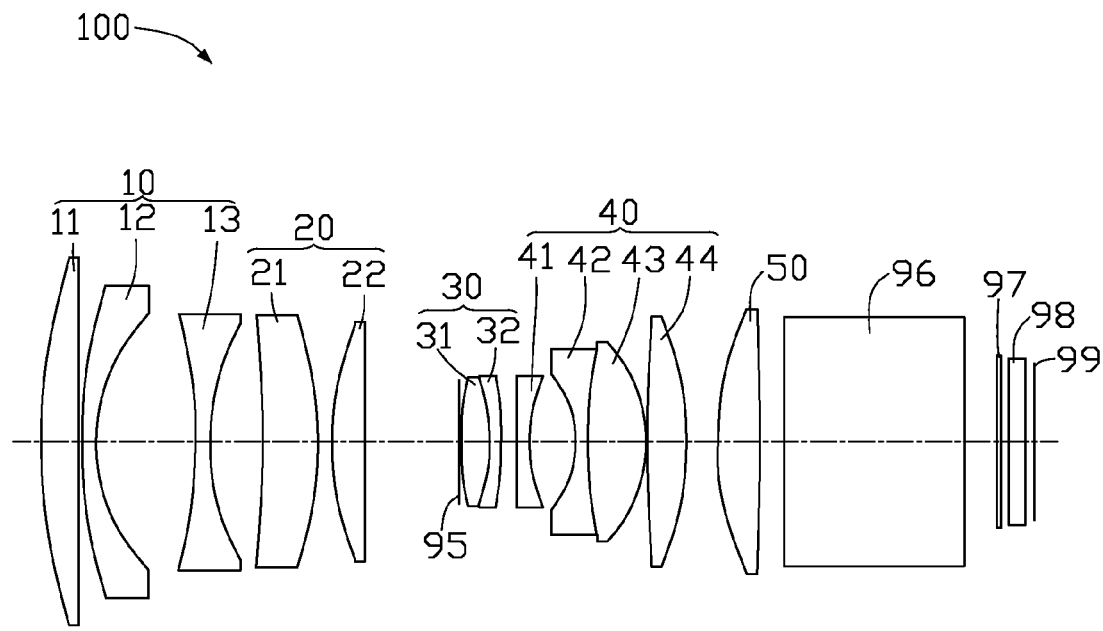
FIG. 2 is a schematic view of the zoom lens of FIG. 1 in a telephoto state.

Referring to FIGS. 1, 2, a zoom lens 100 in accordance with an exemplary embodiment is preferably used in LCOS projectors. Such an LCOS projector is typically equipped with an LCOS panel that has a surface facing the zoom lens 100. The zoom lens 100 includes, in this order from the magnification side to the minification side thereof, a first lens group 10 having negative refraction of power, a second lens group 20 having positive refraction of power, a third lens group 30 having positive refraction of power, a fourth lens group 40 having negative refraction of power, and a fifth lens group 50 having positive refraction of power. The lens groups 10, 50 are immovably mounted, while the lens groups 20, 30, 40 are movably mounted. Thereby, the effective focal length of the zoom lens 100 can be adjusted by moving the lens groups 20, 30, 40 along the optical axis thereof. In particular, the effective focal length can be reduced by moving the lens groups 20, 30, 40 to any point toward the minification side of the zoom lens 100 until they reach a maximum wide angle state as shown in FIG. 1. Conversely, the effective focal length can be increased by moving the lens groups 20, 30, 40 to any point toward the magnification side of the zoom lens 100 until they reach a maximum telephoto state as shown in FIG. 2.

In order for the zoom lens 100 to maintain high resolution over the entire zooming range, the zoom lens 100 satisfies the formulas:

$$-1.5 < F1/Fw < -1.3 \qquad (1)$$

$$1.5 < F2/Fw < 1.8 \qquad (2)$$

$$1.8 < F3/Fw < 2.2 \qquad (3)$$

$$-10 < F4/Fw < -5; \text{ and} \qquad (4)$$

$$2.3 < F5/Fw < 2.8, \qquad (5)$$

Where F1~F5, Fw respectively represent the effective focal length of the lens groups 10~50, and the shortest effective focal length of the zoom lens 100.

The formulas (1)~(5) are configured for favorably distributing the refraction power of the lens groups 10~50 of the zoom lens 100 to enable the zoom lens 100 to maintain a high resolution over the entire zooming range of the zoom lens 100, and to obtain a telecentric zoom lens 100 with a long rear focal length (the distance between the zoom lens 100 and the surface 99) that provides sufficient space to accommodate an arrangement of a polarizer 98, a half-wave plate 97, and polarization bean splitter (PBS) prism 96 of the LCOS projector. By satisfying the formulas (1)~(4), if $-1.5 < F1/Fw$, $1.5 < F2/Fw$, $1.8 < F3/Fw$, and $-10 < F4/Fw$ a long rear focal length of the zoom lens 100 is obtained. Further, if F1/Fw<−1.3, F2/Fw<1.8, F3/Fw<2.2, and F4/Fw<−5 are satisfied, aberrations occurring in the zoom lens 100 can be favorably controlled/corrected, and the resolution of the zoom lens is maintained. Furthermore, if the formula (5) is satisfied, the telecentric characteristic of the zoom lens 100 is also maintained.

In order to control lateral chromatic aberration occurring in the zoom lens 100, the zoom lens 100 further satisfies the formula: V1>55, where V1 is the average Abbe number of all lenses in the first lens group 10.

Specifically, the first lens group 10 includes, in this order from the magnification side to the minification side of the zoom lens 100, a first lens 11 having positive refraction of power, a second lens 12 having negative refraction of power, and a third lens 13 having negative refraction of power.

The second lens group 20 includes, in this order from the magnification side to the minification side of the zoom lens 100, a fourth lens 21 having positive refraction of power, and a fifth lens 22 having positive refraction of power.

The third lens group 30 includes, in this order from the magnification side to the minification side of the zoom lens 100, a sixth lens 31 having positive refraction of power, and a seventh lens 32 having negative refraction of power. Opportunely, the lenses 31, 32 are attached together using adhesive to reduce the overall length of the zoom lens 100.

The fourth lens group 40 includes, in this order from the magnification side to the minification side of the zoom lens 100, a eighth lens 41 having negative refraction of power, a ninth lens 42 having negative refraction of power, a tenth lens 43 having positive refraction of power, and an eleventh lens 44 having positive refraction of power. Opportunely, the lenses 42, 43 are attached together using adhesive to reduce the overall length of the zoom lens 100.

The fifth lens group 50 is a twelfth lens having positive refraction of power.

Additionally, the zoom lens 100 further includes an aperture stop 95, the aperture stop is interposed between the lens groups 20, 30 (the lenses 22, 31) to block off-axis light rays from the sixth lens 31 entering the fifth lens 22, and thereby preventing too much distortion occurring in the zoom lens 100 (the off-axis light rays are the main cause of distortion).

Opportunely and specifically, the lenses of the zoom lens 100 are advantageously spherical glass lenses to reduce cost of the zoom lens 100 and control lateral chromatic aberration occurring in the zoom lens 100.

Detailed examples of the zoom lens 100 are given below in company with FIGS. 3~26 but it should be noted that the zoom lens 100 is not limited to these examples. Listed below are the symbols used in these detailed examples:

$F_{No}$: F number;

2ω: field angle;

R: radius of curvature;

d: distance between surfaces on the optical axis of the zoom lens 100;

Nd: refractive index of lens; and

V: Abbe constant.

When projecting an image, the image is modulated by the LCOS panel, and projects from the surface 99, transmits through the polarizer 98, the half-wave plate 97, the PBS prism 96, the zoom lens 100, and finally projects onto a screen (not shown).

Example 1

Tables 1, 2 show the lens data of Example 1, wherein F1=−28.8377 mm, F2=33.0414 mm, F3=40.8227 mm, F4=−141.6108 mm, and F5=49.8472 mm.

TABLE 1

| Surface | R(mm) | D(mm) | Nd | V |
|---|---|---|---|---|
| The magnification-side surface of the first lens 11 | 79.971 | 5.035 | 1.6451 | 55.8878 |
| The minification-side surface surface of the first lens 11 | −998.751 | 0.15 | — | — |
| The magnification-side surface of the second lens 12 | 67.492 | 1.8 | 1.5569 | 64.1644 |
| The minification-side surface of the second lens 12 | 23.691 | 8.847 | — | — |
| The magnification-side surface of the third lens 13 | −65.086 | 1.8 | 1.5994 | 54.9599 |
| The minification-side surface of the third lens 13 | 31.281 | D6 (see table 2) | — | — |
| The magnification-side surface of the fourth lens 21 | −161.501 | 6.962 | 1.744 | 44.8511 |
| The minification-side surface of the fourth lens 21 | −51.457 | 1.83 | — | — |
| The magnification-side surface of the fifth lens 22 | 40.839 | 4.456 | 1.7491 | 34.8735 |
| The minification-side surface of the fifth lens 22 | −423.711 | D10 (see table 2) | — | — |
| The surface of aperture stop 95 | infinite | 0.15 | — | — |
| The magnification-side surface of the sixth lens 31 | 34.659 | 3.664 | 1.5354 | 65.8156 |
| The interface between the sixth lens 31 and the seventh lens 32 | −25.822 | 1.5 | 1.5807 | 41.3411 |
| The minification-side surface of the seventh lens 32 | −51.645 | D14 (see table 2) | — | — |
| The magnification-side surface of the eighth lens 41 | 397.031 | 1.818 | 1.7141 | 29.4552 |
| The minification-side surface of the eighth lens 41 | 21.915 | 5.837 | — | — |
| The magnification-side surface of the ninth lens 42 | −13.929 | 1.501 | 1.754 | 28.7225 |
| The interface between the ninth lens 42 and the tenth lens 43 | 59.422 | 7.391 | 1.5856 | 62.2659 |
| The minification-side surface of the tenth lens 43 | −19.005 | 0.15 | — | — |
| The magnification-side surface of the eleventh lens 44 | 244.496 | 4.966 | 1.744 | 44.8504 |
| The minification-side surface of the eleventh lens 44 | −41.299 | D21 (see table 2) | — | — |
| The magnification-side surface of the twelfth lens | 40.697 | 5.372 | 1.744 | 44.8504 |
| The minification-side surface of the twelfth lens | −416.332 | 3 | — | — |
| Magnification-side surface of the PBS prism 96 | infinite | 23 | 1.5168 | 64.1673 |
| Minification-side surface of the PBS prism 96 | infinite | 4 | — | — |
| Magnification-side surface of the half-wave plate 97 | infinite | 0.5 | 1.523014 | 58.5876 |
| Minification-side surface of the halfwave plate 97 | infinite | 1 | — | — |
| Magnification-side surface of the polarizer 98 | infinite | 2.2 | 1.5168 | 64.1673 |
| Minification-side surface of the polarizer 98 | infinite | 1 | — | — |
| The surface 99 | infinite | — | — | — |

TABLE 2

| Lens state | F (mm) | $F_{No}$ | 2ω | D1 (mm) | D2 (mm) | D3 (mm) | D4 (mm) |
|---|---|---|---|---|---|---|---|
| Wide angle state | 19.94 | 1.82 | 54.3° | 12.818 | 14.576 | 0.2 | 0.18 |
| Telephoto state | 23.92 | 2.05 | 45.92° | 7.1 | 12.761 | 3.205 | 3.31 |

Figure 3:
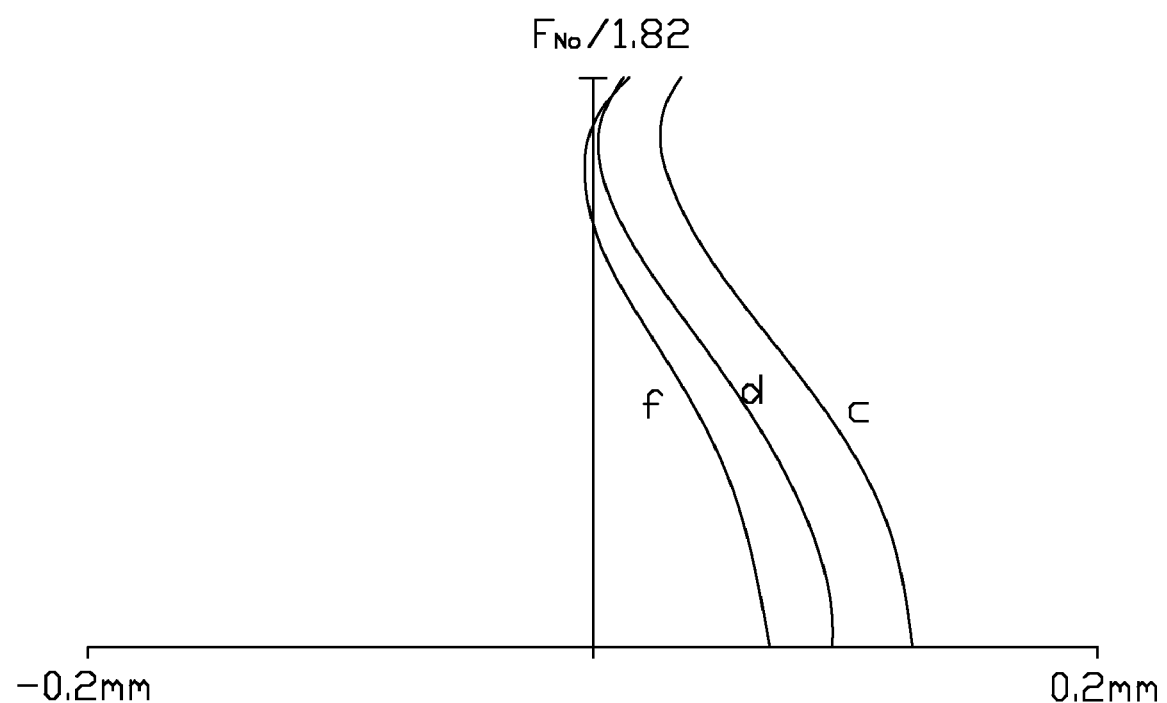
FIGS. 3~6 are graphs respectively showing spherical aberration, field curvature, distortion, and lateral chromatic aberration occurring in the zoom lens in the wide angle state as in FIG. 1, according to a second embodiment.
Figure 4:
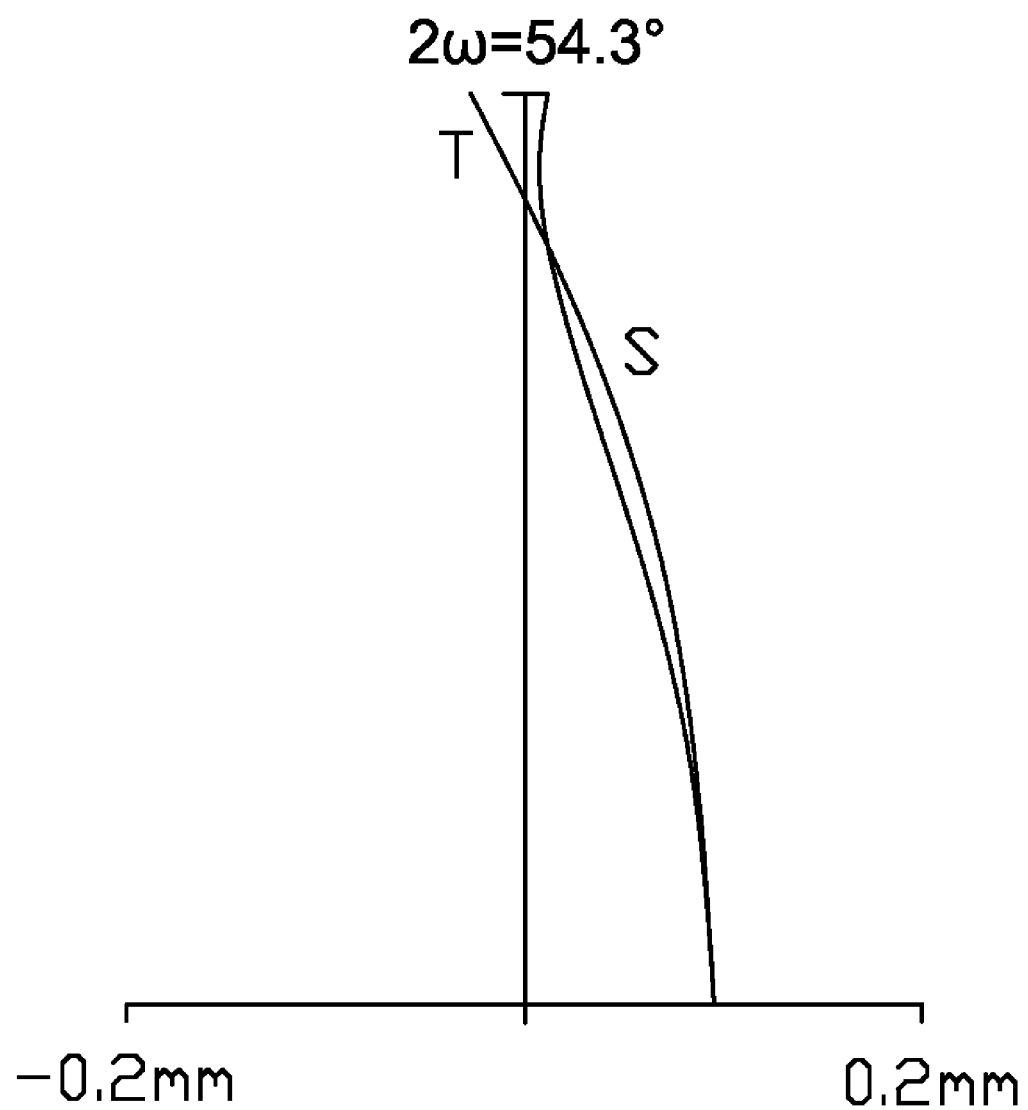
Figure 5:
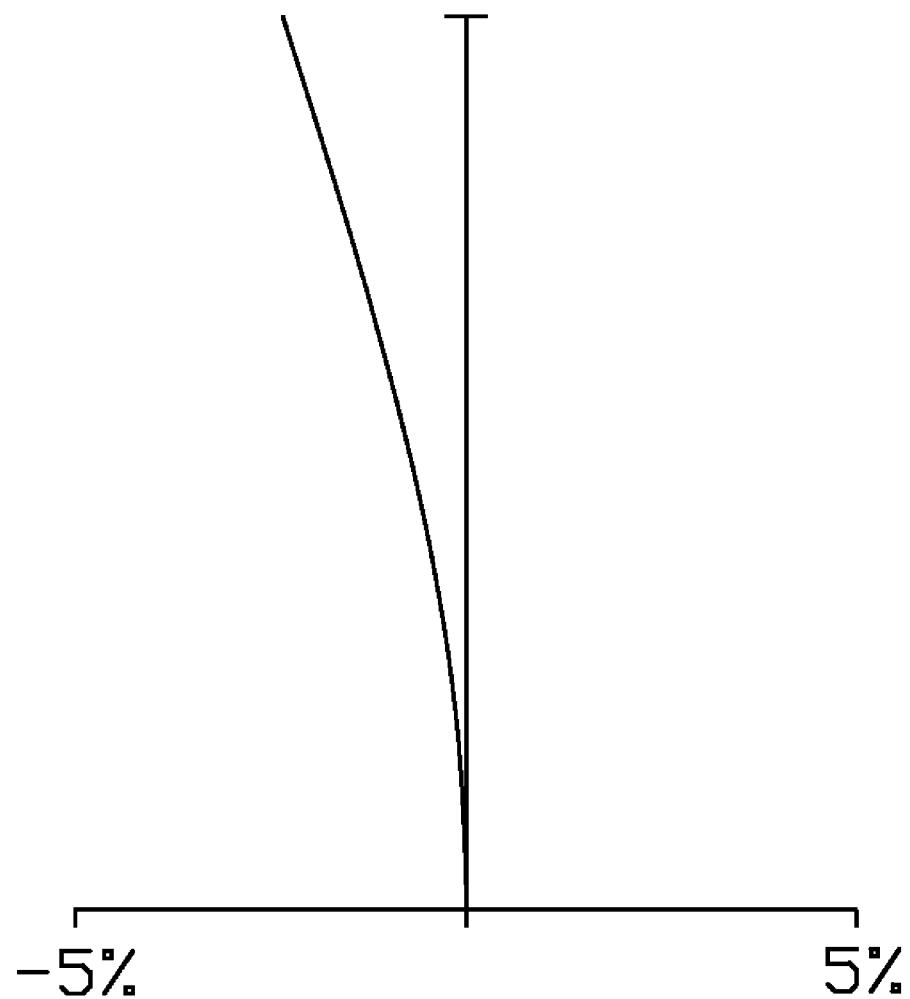
Figure 6:
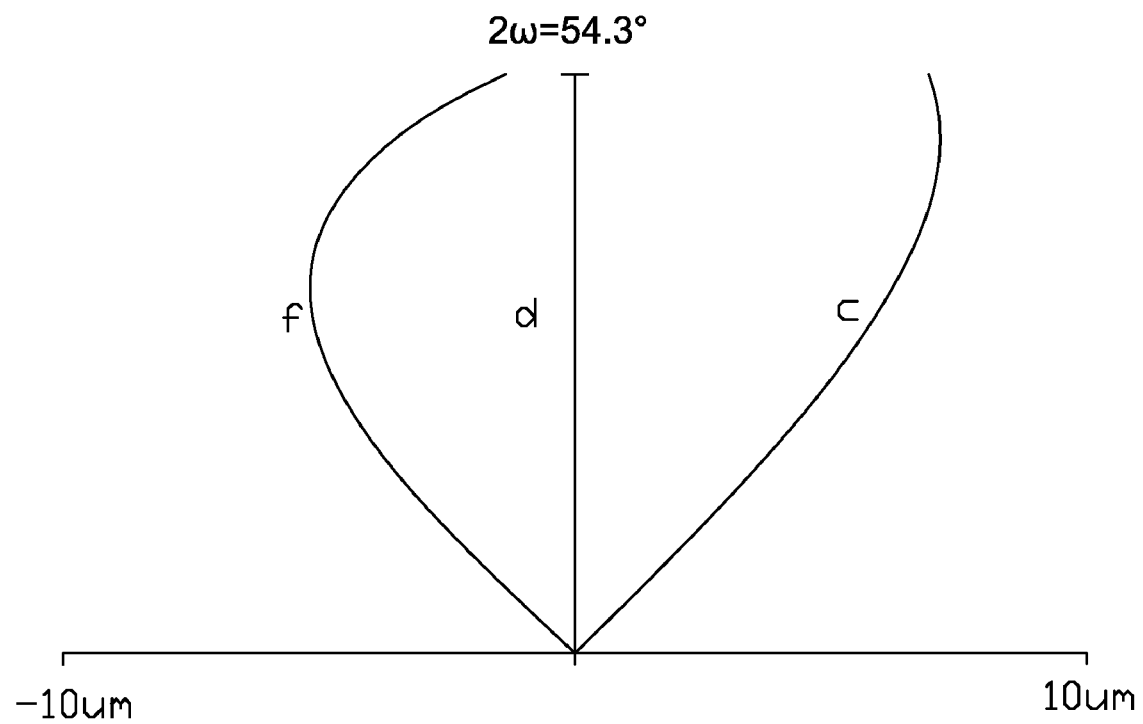
Figure 7:
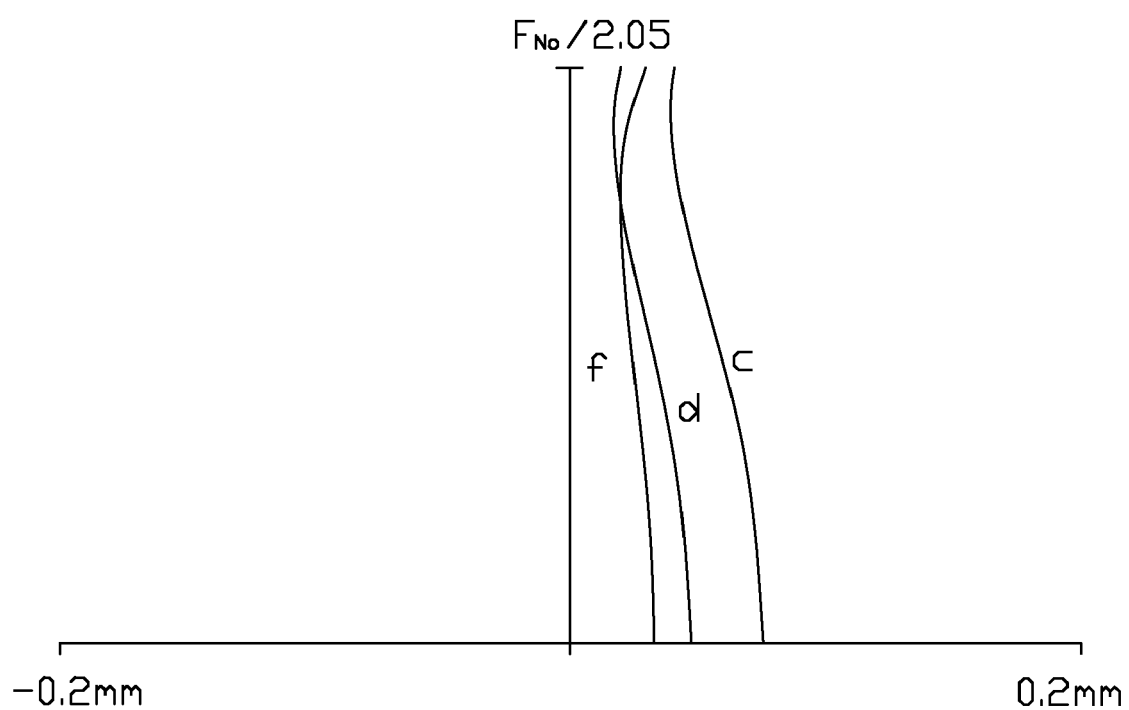
FIGS. 7~10 are graphs respectively showing spherical aberration, field curvature, distortion, and lateral chromatic aberration occurring in the zoom lens in the telephoto state as in FIG. 2, according to a second embodiment.
Figure 8:
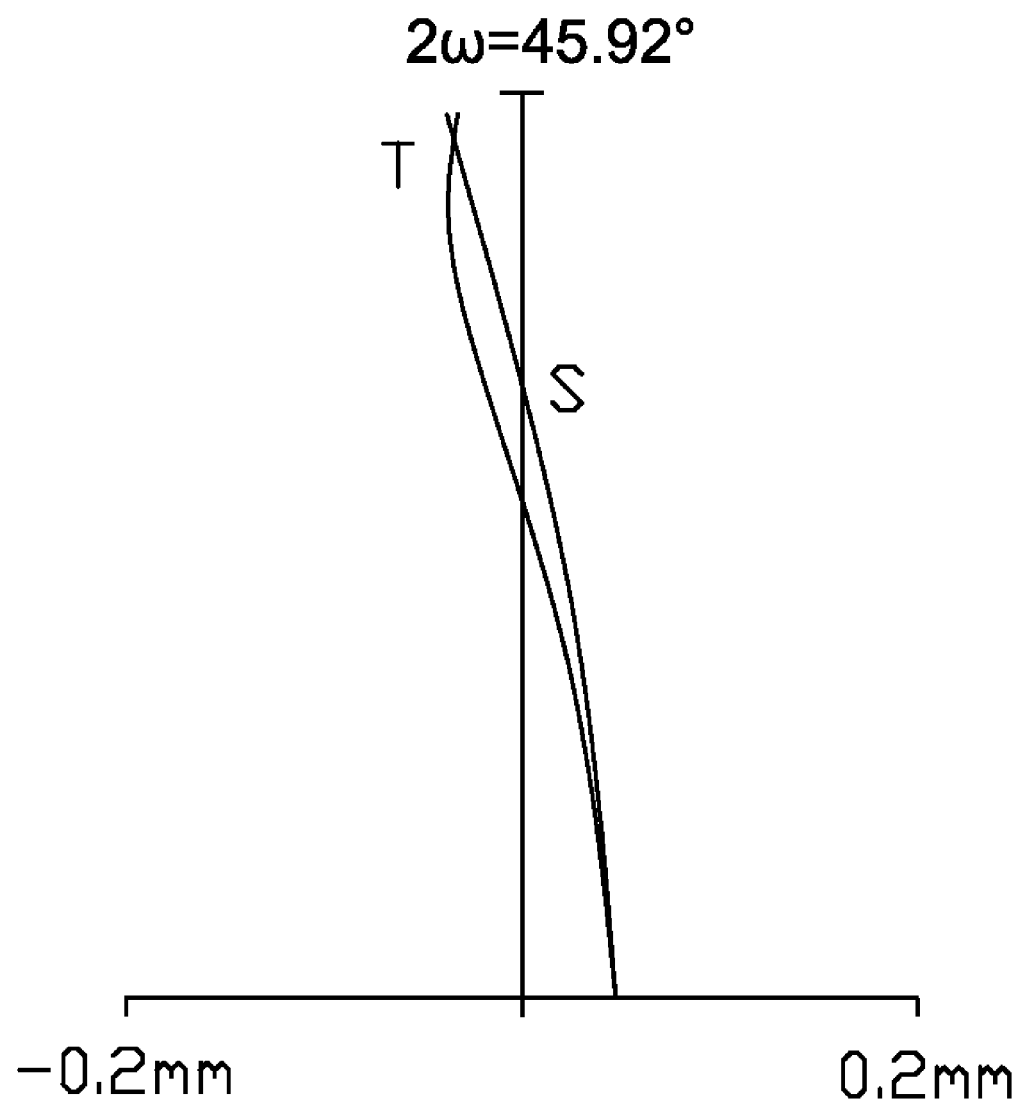
Figure 9:
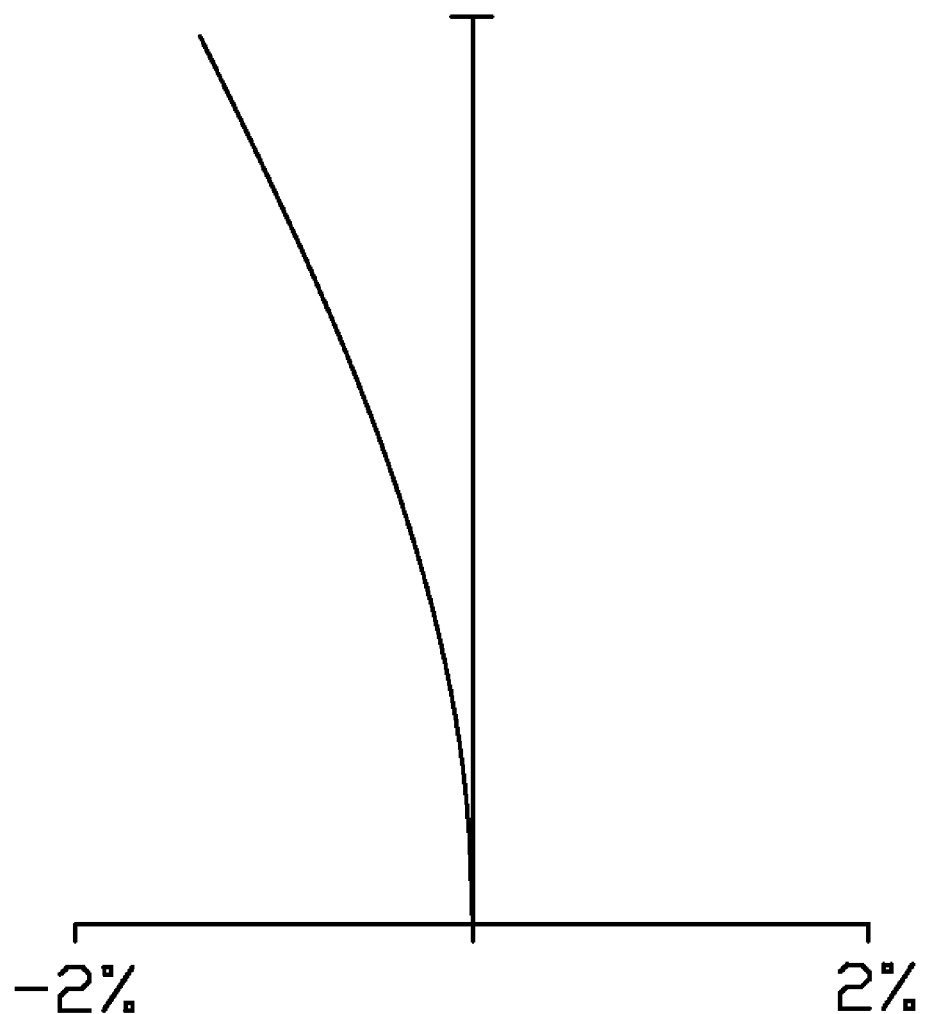
Figure 10:
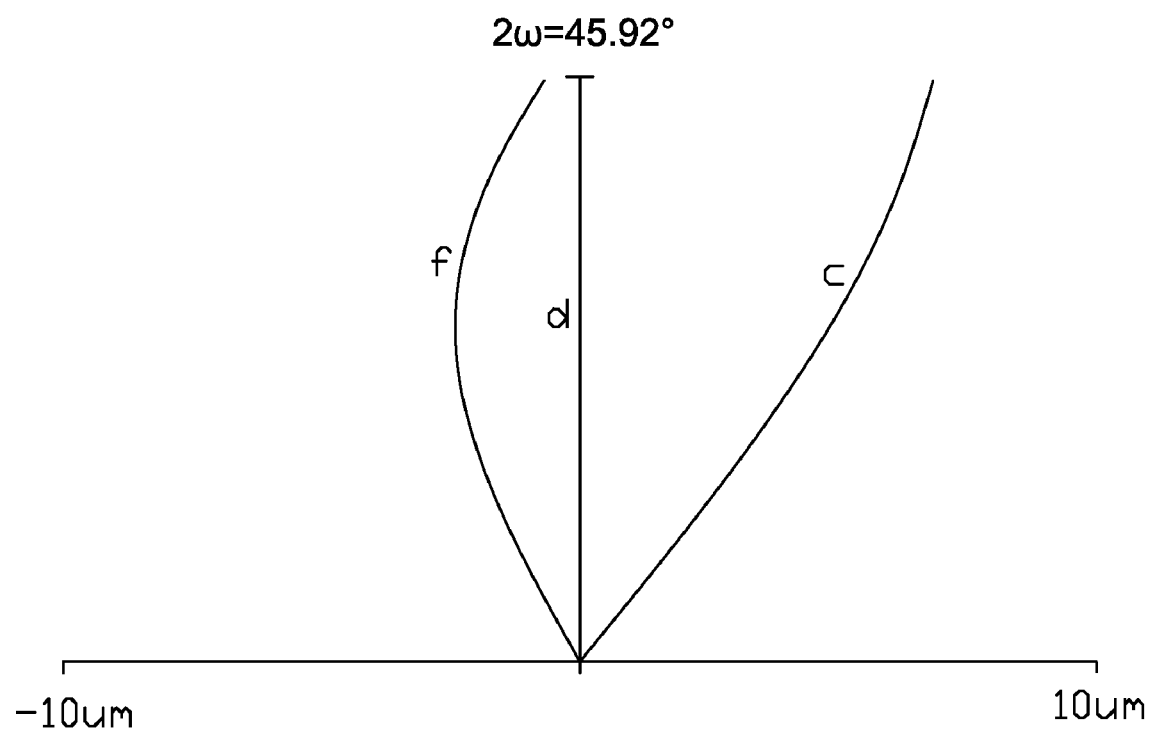
Figure 11:
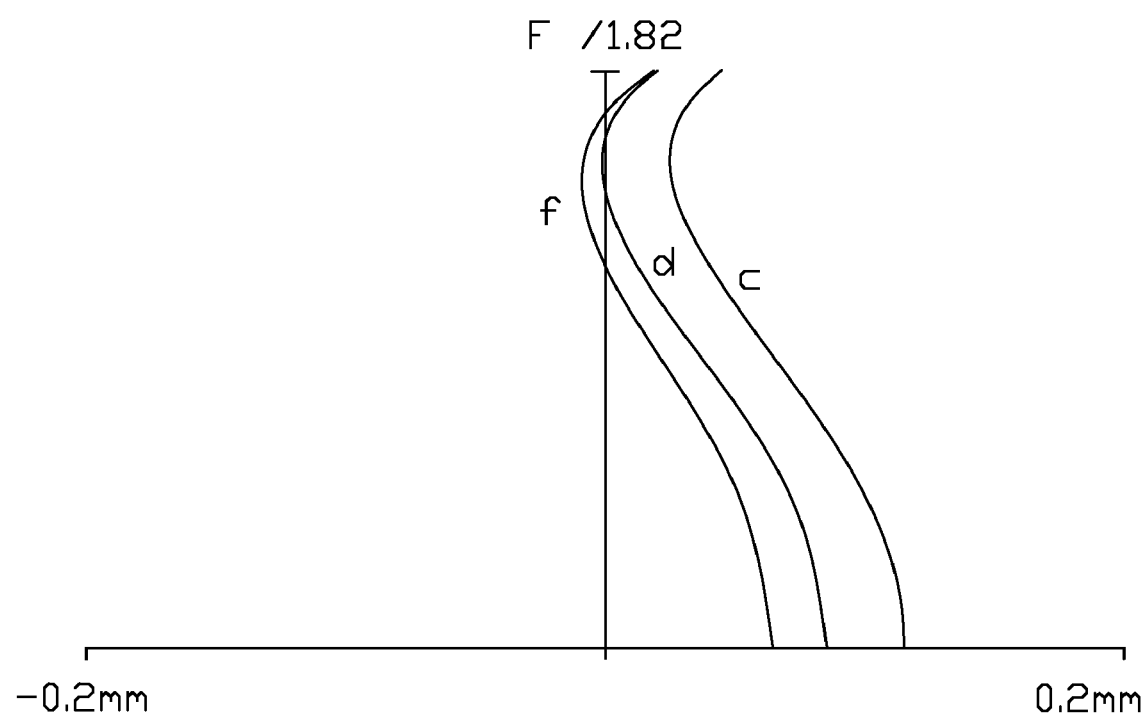
FIGS. 11~14 are graphs respectively showing spherical aberration, field curvature, distortion, and lateral chromatic aberration occurring in the zoom lens in the wide angle state as in FIG. 1, according to a third embodiment.
Figure 12:
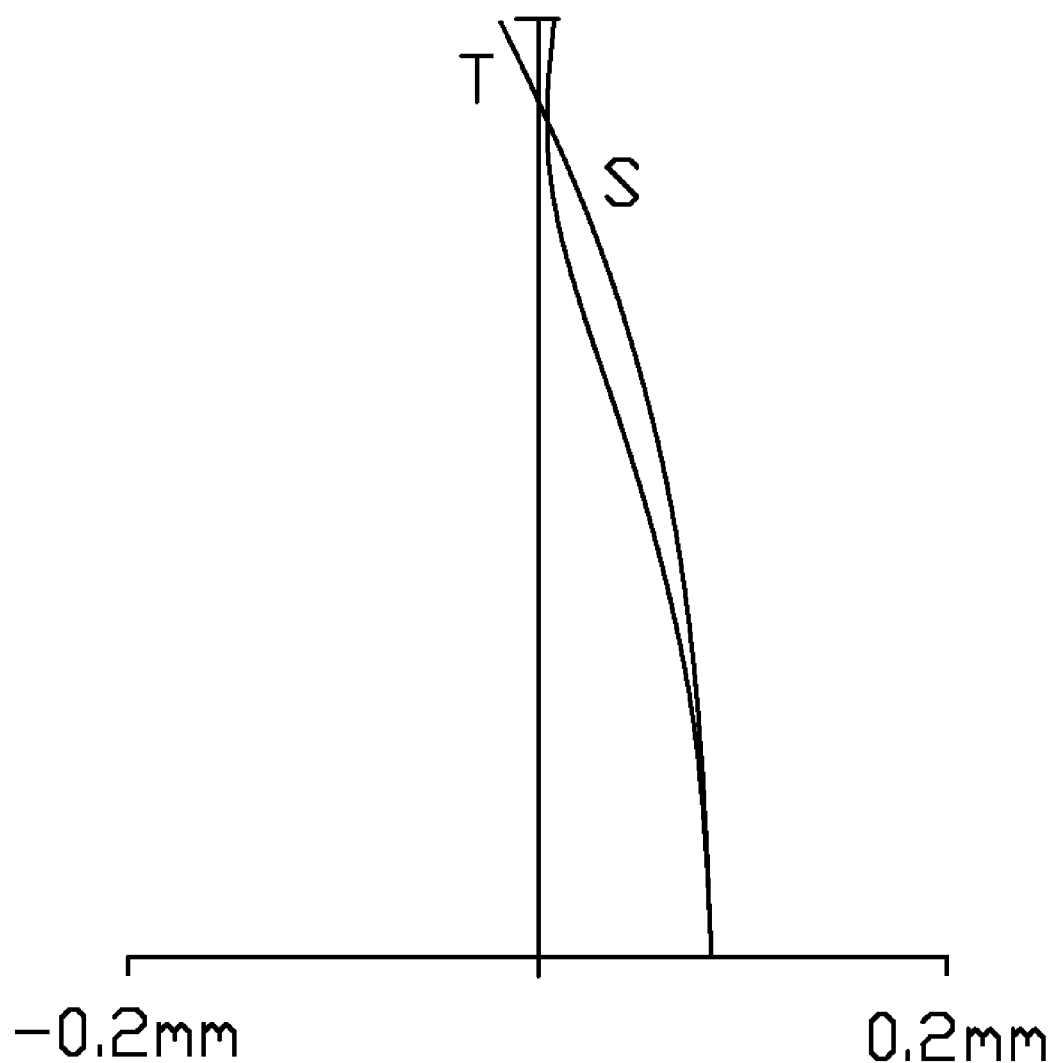
Figure 13:
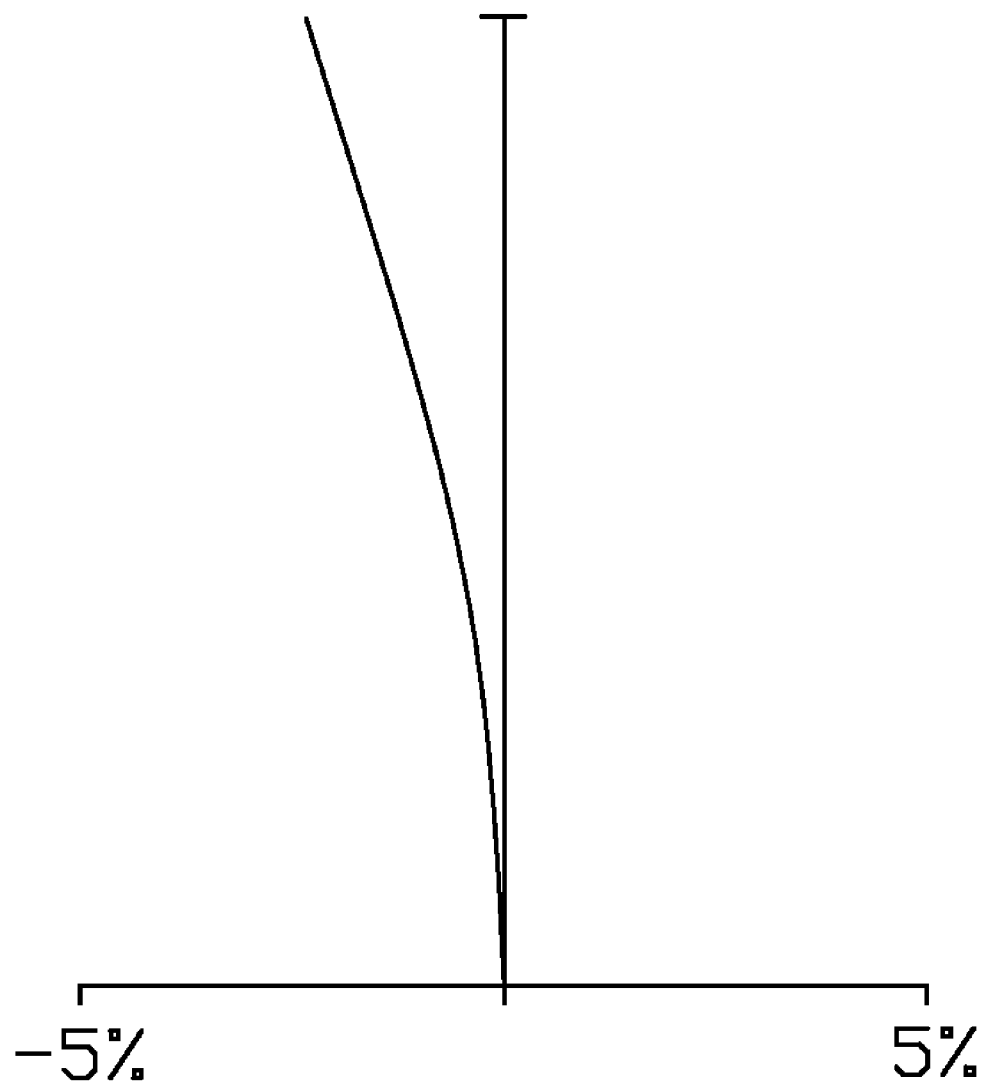
Figure 14:
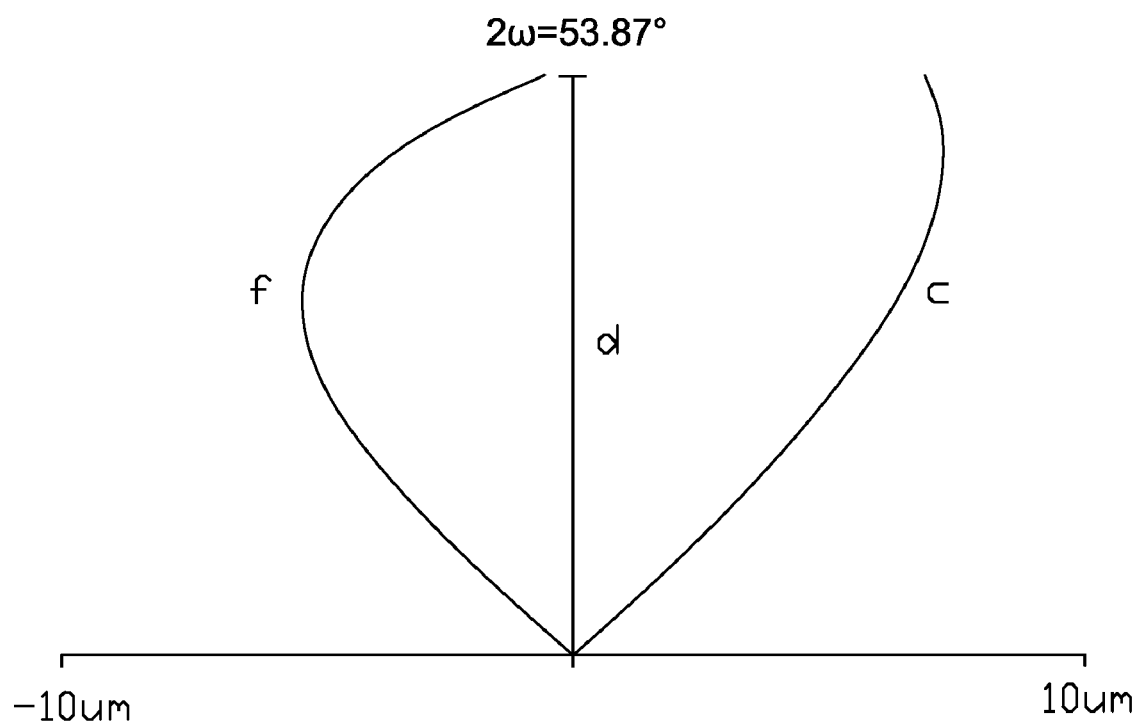
Figure 15:
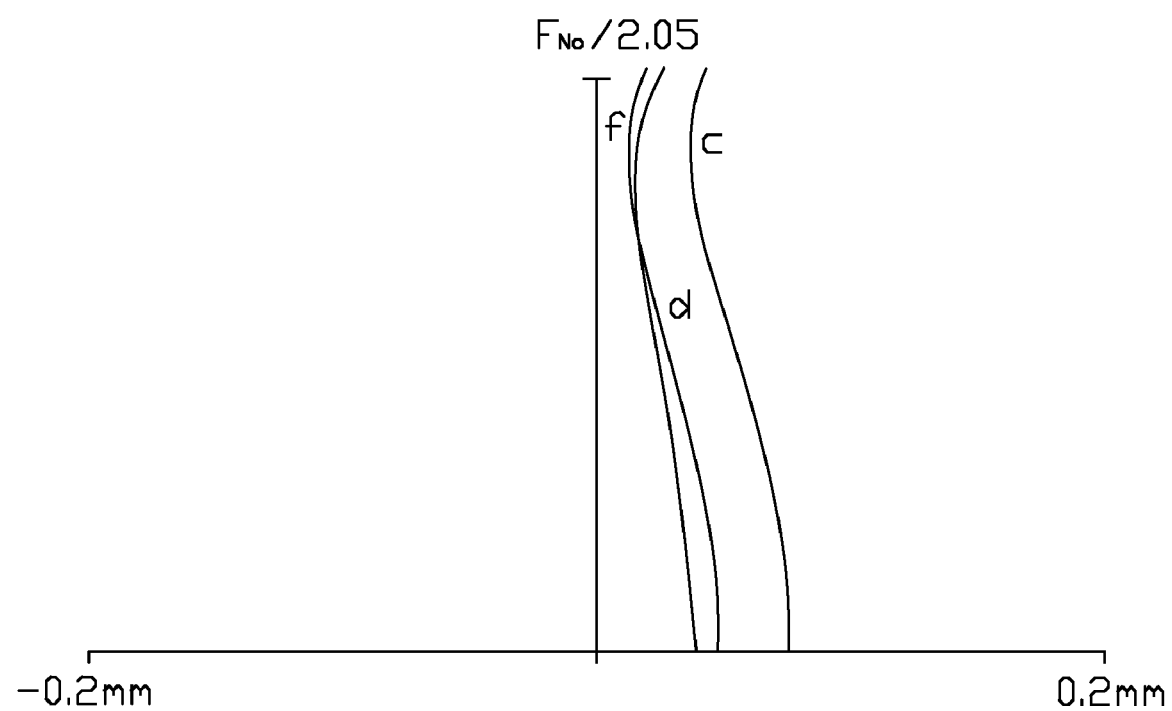
FIGS. 15~18 are graphs respectively showing spherical aberration, field curvature, distortion, and lateral chromatic aberration occurring in the zoom lens in the telephoto state as in FIG. 2, according to a third embodiment.
Figure 16:
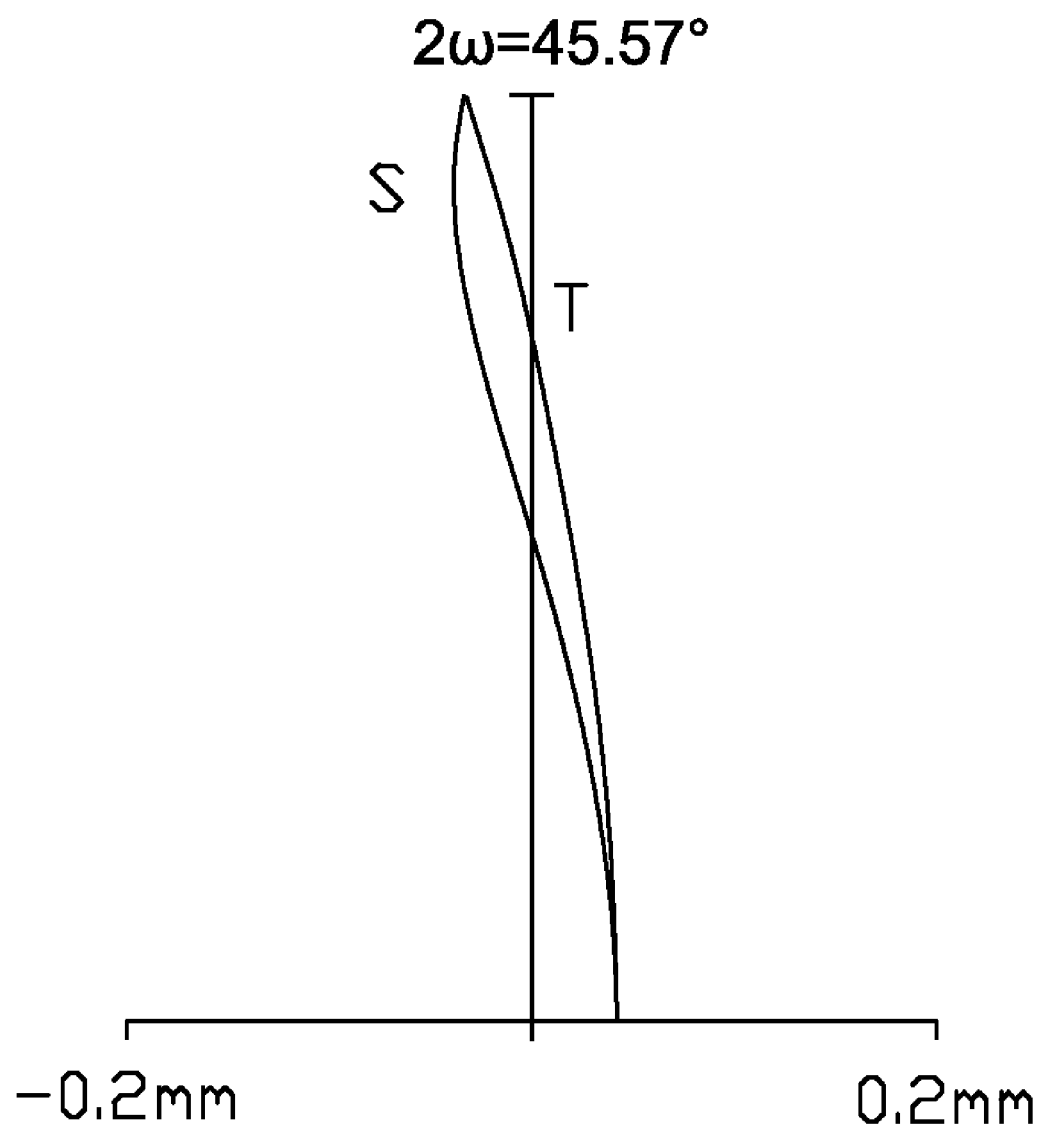
Figure 17:
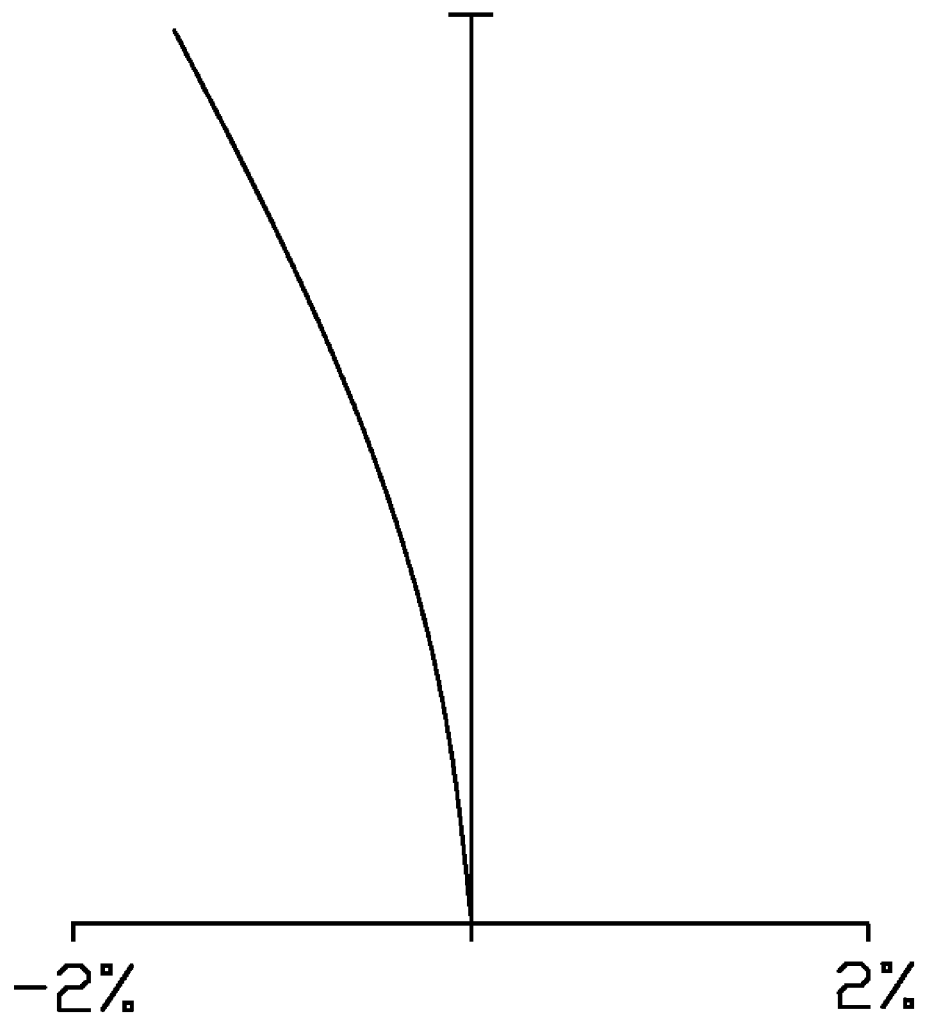
Figure 18:
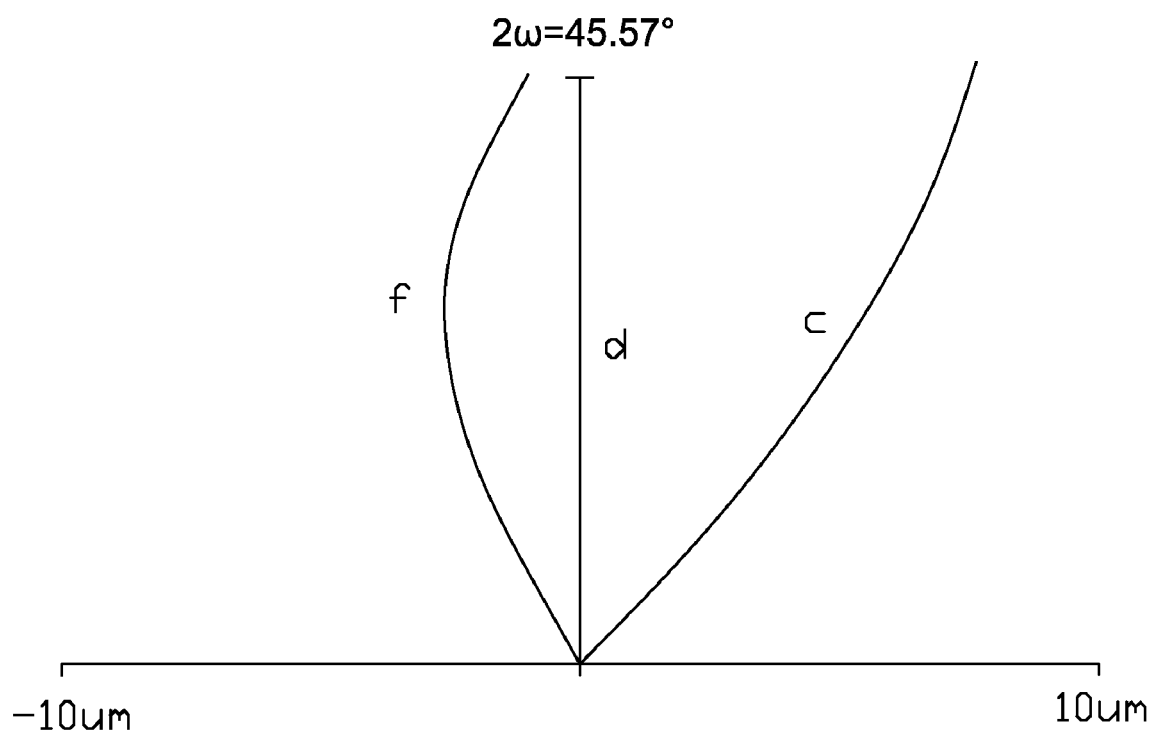
Figure 19:
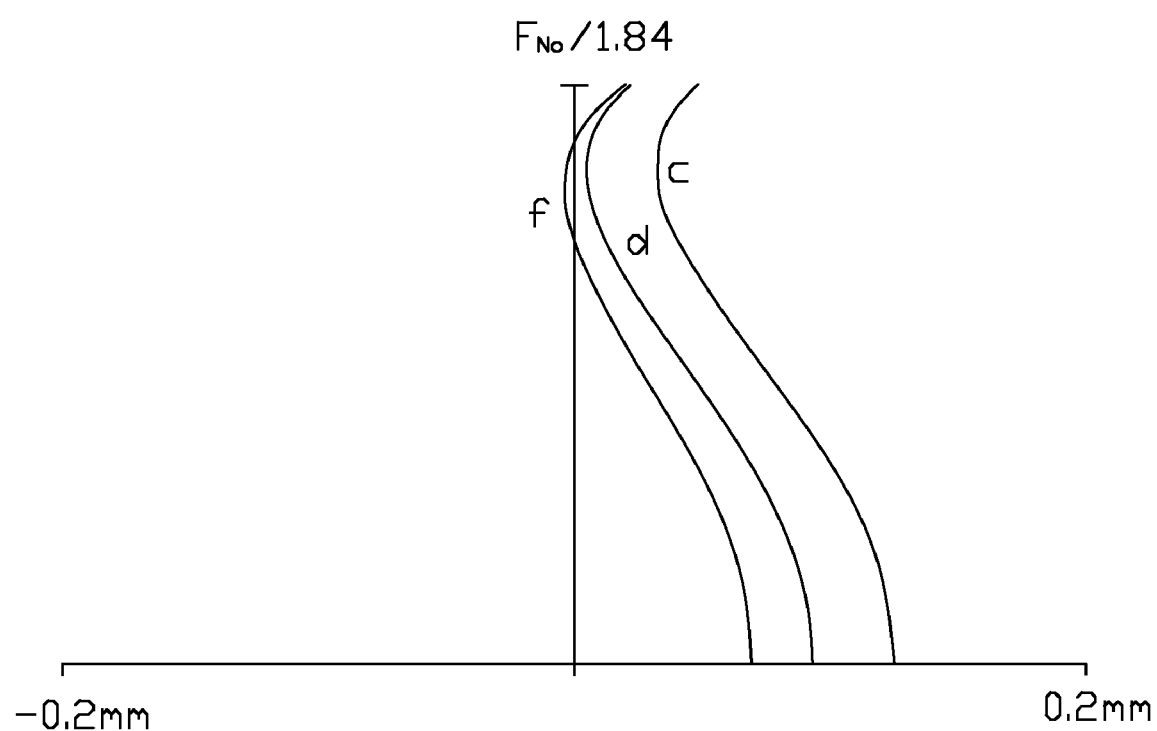
FIGS. 19~22 are graphs respectively showing spherical aberration, field curvature, distortion, and lateral chromatic aberration occurring in the zoom lens in the wide angle state as in FIG. 1, according to a fourth embodiment.
Figure 20:
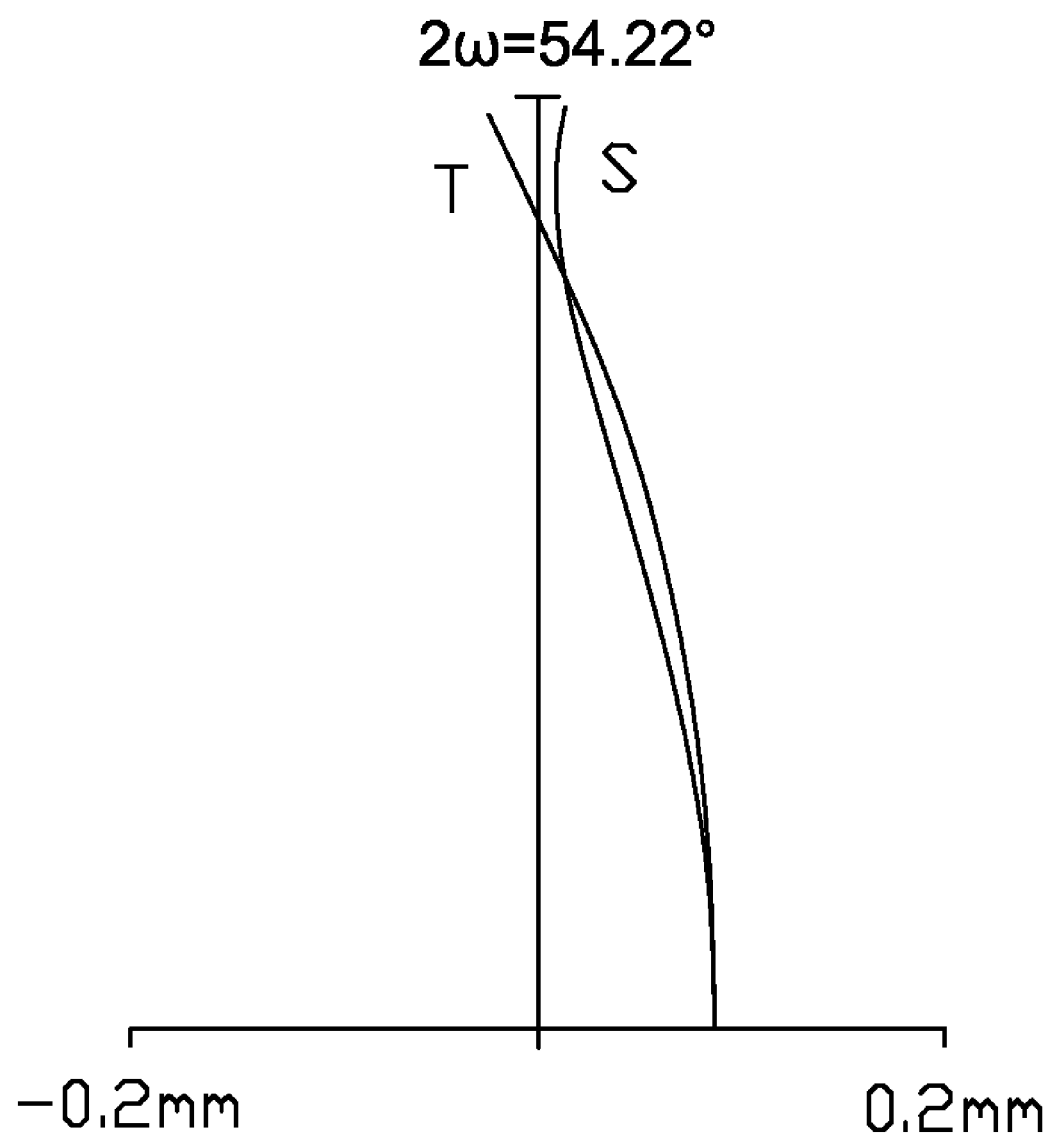
Figure 21:
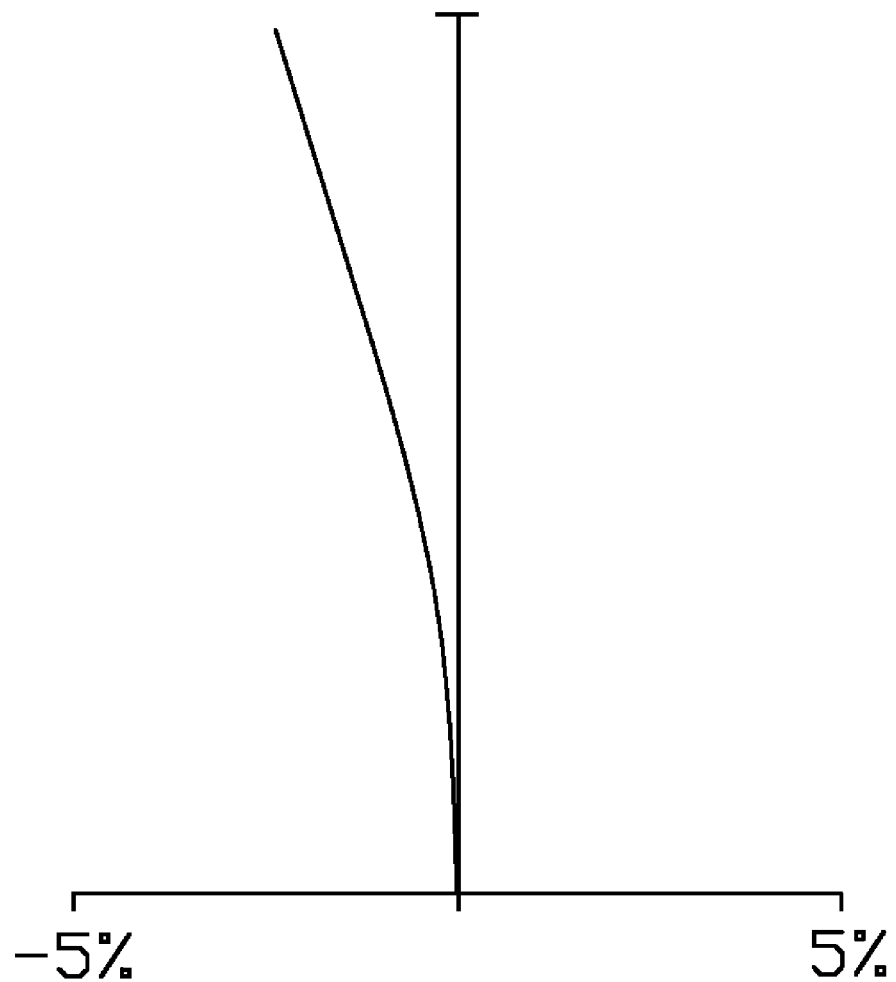
Figure 22:
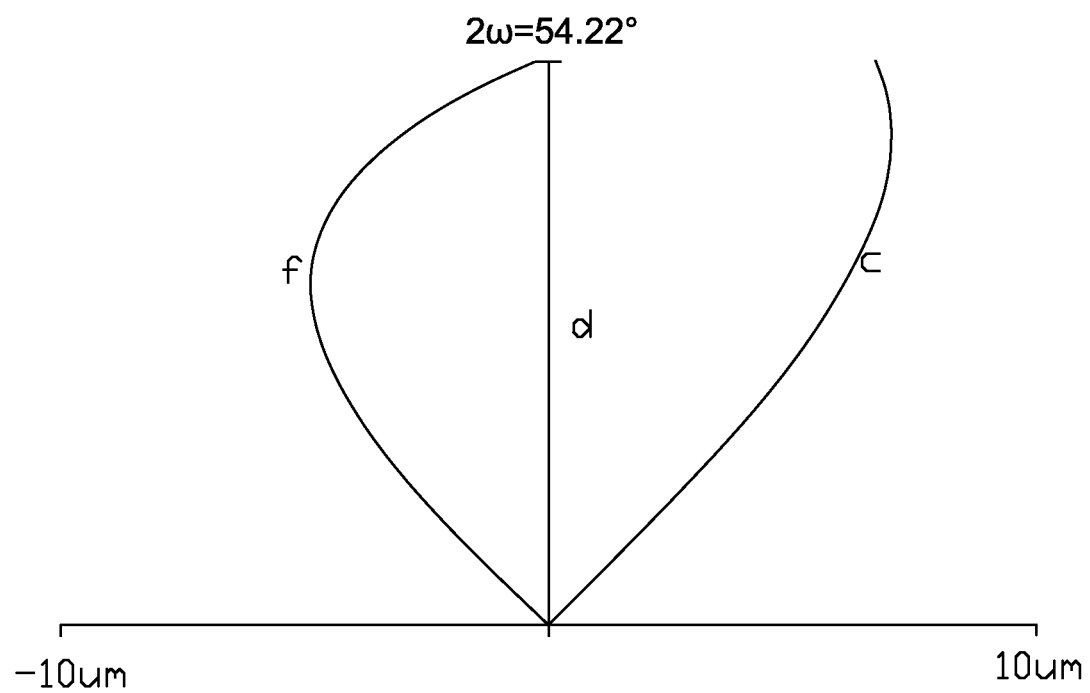
Figure 23:
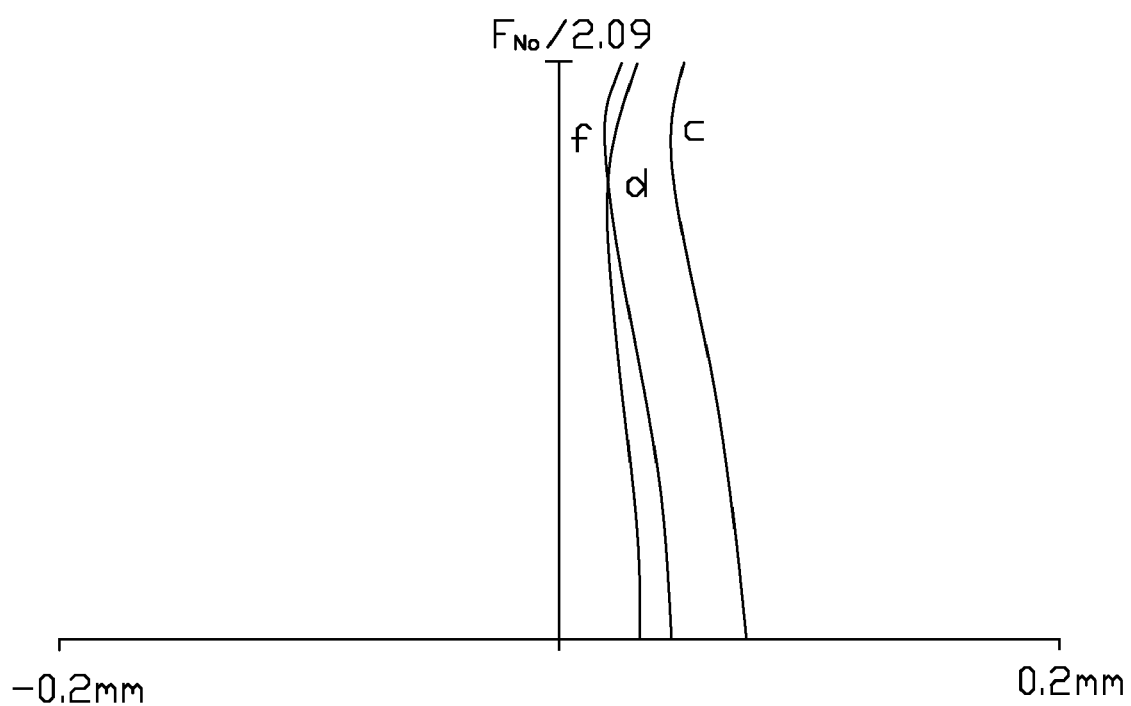
FIGS. 23~26 are graphs respectively showing spherical aberration, field curvature, distortion, and lateral chromatic aberration occurring in the zoom lens in the telephoto state as in FIG. 2, according to a fourth embodiment.
Figure 24:
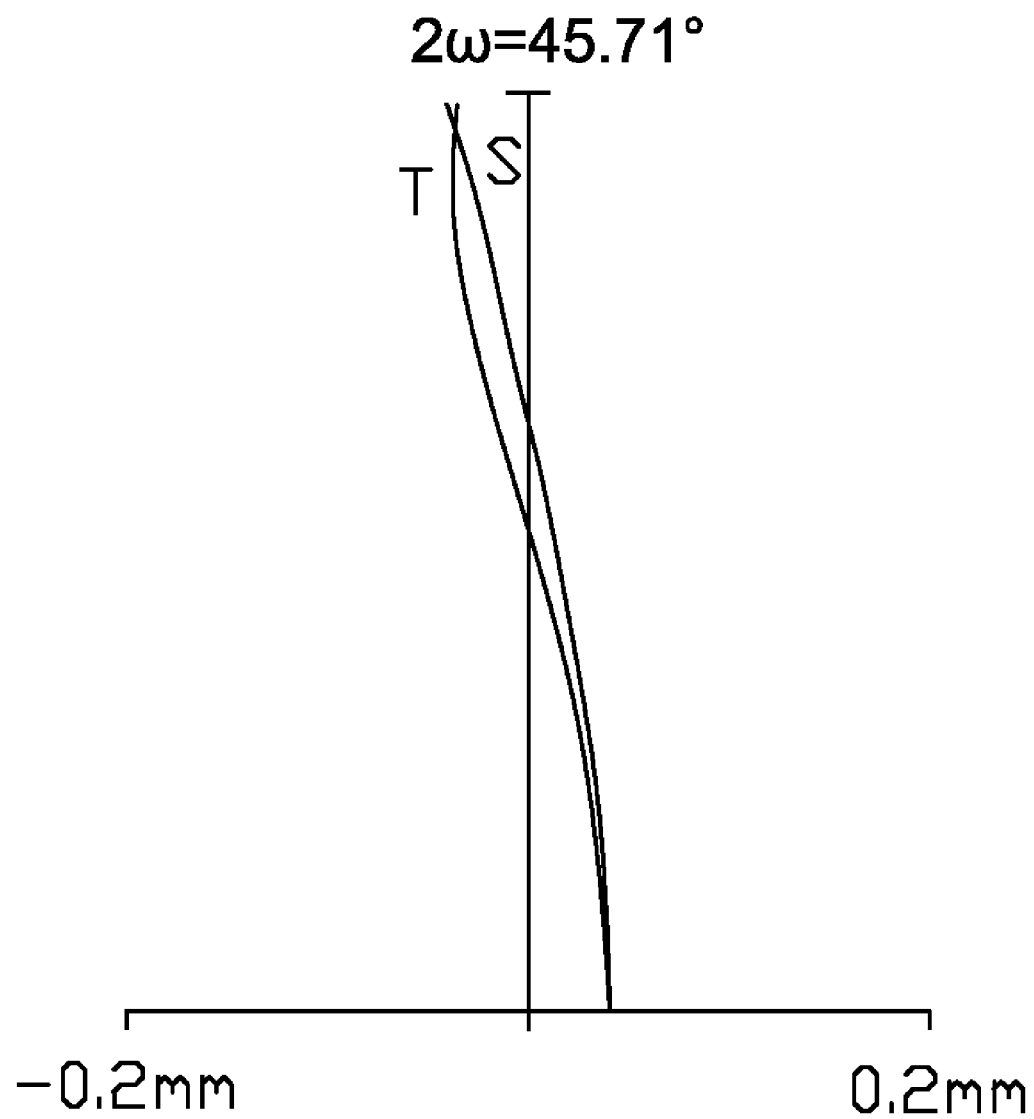
Figure 25:
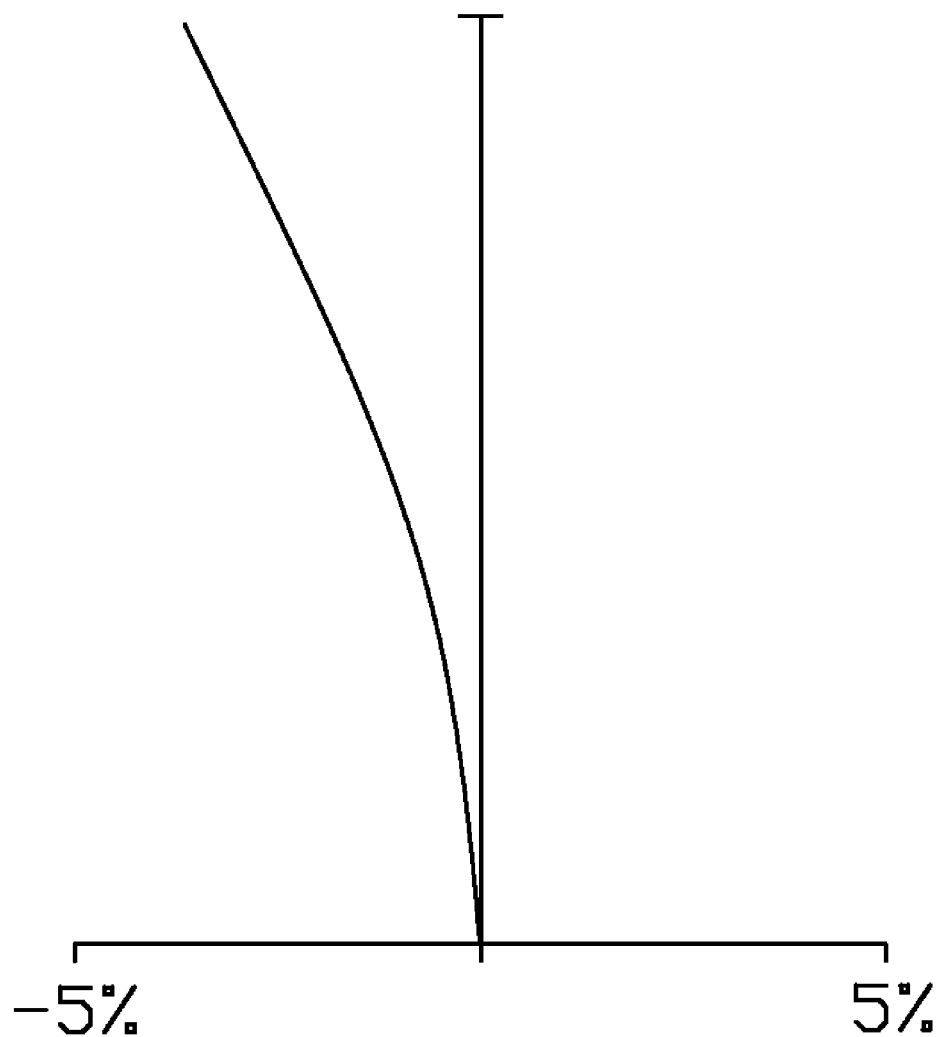
Figure 26:
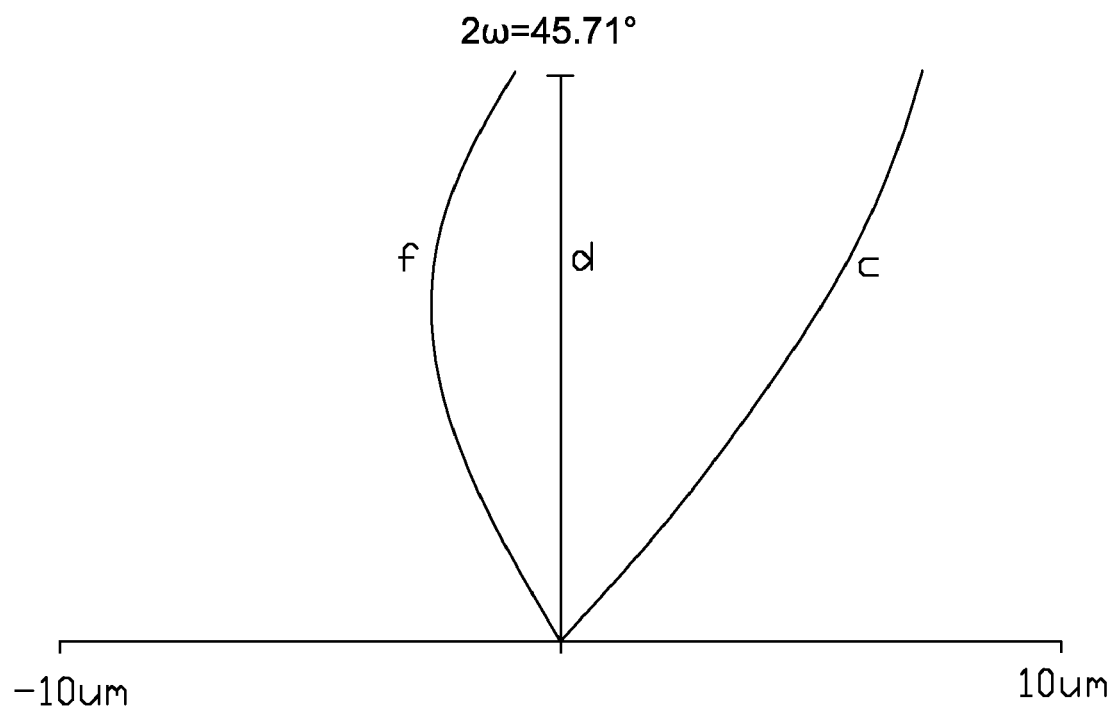

In FIG. 3 (wide angle state) and FIG. 7 (telephoto state), spherical aberration characteristic curves of f light (486.1 nm), d light (587.6 nm), and c light (656.3 nm) occurring in the zoom lens 100 of Example 1 are shown. Obviously, spherical aberration occurring in the zoom lens 100 of Example 1 is limited to be in a range of: ~0.2 mm~0.2 mm. In FIG. 4 (wide angle state) and FIG. 8 (telephoto state), the curves t and s are the tangential field curvature curve and the sagittal field curvature curve respectively. Clearly, field curvature occurring in the zoom lens 100 of Example 1 is limited to a range of: −0.2 mm~0.2 mm. In FIG. 5 (wide angle state) and FIG. 9 (telephoto state), distortion occurring in the zoom lens 100 of Example 1 is limited to be within the range of: −5%~5%. In FIG. 6 (wide angle state) and FIG. 10 (telephoto state), characteristic curves of lateral chromatic aberration of 460 nm, and 620 nm light occurring in the zoom lens 100 of Example 1 are shown. Obviously, lateral chromatic aberration occurring in the zoom lens 100 of Example 1 is limited to a range of: −10 um~10 um.

Tables 3, 4 show the lens data of Example 2, wherein F1=−29.3527 mm, F2=33.8755 mm, F3=40.6828 mm, F4=−152.5071 mm, and F5=51.142 mm.

TABLE 3

| Surface | R(mm) | D(mm) | Nd | V |
|---|---|---|---|---|
| The magnification-side surface of the first lens 11 | 82.072 | 4.916 | 1.7023 | 48.5664 |
| The minification-side surface of the first lens 11 | −1344.621 | 0.17 | — | — |
| The magnification-side surface of the second lens 12 | 63.239 | 1.8 | 1.5131 | 67.7652 |
| The minification-side surface of the second lens 12 | 22.918 | 8.968 | — | — |
| The magnification-side surface of the third lens 13 | −64.557 | 1.8 | 1.6315 | 50.4312 |
| The minification-side surface of the third lens 13 | 32.077 | D6 (see table 4) | — | — |
| The magnification-side surface of the fourth lens 21 | −153.501 | 7 | 1.6807 | 50.9542 |
| The minification-side surface of the fourth lens 21 | −49.356 | 0.17 | — | — |
| The magnification-side surface of the fifth lens 22 | 40.843 | 4.391 | 1.7306 | 31.8018 |

TABLE 3-continued

| Surface | R(mm) | D(mm) | Nd | V |
|---|---|---|---|---|
| The minification-side surface of the fifth lens 22 | −446.649 | D10 (see table 4) | — | — |
| The surface of aperture stop 95 | infinite | 0.618 | — | — |
| The magnification-side surface of the sixth lens 31 | 35.173 | 3.468 | 1.5379 | 65.6053 |
| The interface between the sixth lens 31 and the seventh lens 32 | −25.518 | 1.835 | 1.5736 | 42.4801 |
| The minification-side surface of the seventh lens 32 | −51.491 | D14 (see table 4) | — | — |
| The magnification-side surface of the eighth lens 41 | 387.75 | 1.726 | 1.785 | 25.7 |
| The minification-side surface of the eighth lens 41 | 23.589 | 5.266 | — | — |
| The magnification-side surface of the ninth lens 42 | −13.857 | 1.846 | 1.7526 | 30.2169 |
| The interface between the ninth lens 42 and the tenth lens 43 | 59.027 | 7.288 | 1.5802 | 62.5994 |
| The minification-side surface of the tenth lens 43 | −18.948 | 0.17 | — | — |
| The magnification-side surface of the eleventh lens 44 | 196.349 | 5.027 | 1.7443 | 43.9698 |
| The minification-side surface of the eleventh lens 44 | −41.835 | D21 (see table 4) | — | — |
| The magnification-side surface of the twelfth lens | 41.332 | 5.263 | 1.7427 | 44.9509 |
| The minification-side surface of the twelfth lens | −470.461 | 4.188 | — | — |
| Magnification-side surface of the PBS prism 96 | infinite | 23 | 1.5168 | 64.1673 |
| Minification-side surface of the PBS prism 96 | infinite | 4 | — | — |
| Magnification-side surface of the halfwave plate 97 | infinite | 0.5 | 1.523014 | 58.5876 |
| Minification-side surface of the halfwave plate 97 | infinite | 1 | — | — |
| Magnification-side surface of the polarizer 98 | infinite | 2.2 | 1.5168 | 64.1673 |
| Minification-side surface of the polarizer 98 | infinite | 1 | — | — |
| The surface 99 | infinite | — | — | — |

TABLE 4

| Lens state | F (mm) | $F_{No}$ | 2ω | D1 (mm) | D2 (mm) | D3 (mm) | D4 (mm) |
|---|---|---|---|---|---|---|---|
| Wide angle state | 20.12 | 1.82 | 53.87° | 13.702 | 15.406 | 0.21 | 0.2 |
| Telephoto state | 24.14 | 2.05 | 45.57° | 7.957 | 13.641 | 3.281 | 3.446 |

As illustrated in FIGS. 11~18, Spherical aberration occurring in the zoom lens 100 of Example 2 is limited to be in a range of: −0.2 mm~0.2 mm, field curvature occurring in the zoom lens 100 of Example 2 is limited to a range of: −0.15 mm~0.15 mm, distortion occurring in the zoom lens 100 of Example 2 is limited to be within the range of: −5%~5%, lateral chromatic aberration occurring in the zoom lens 100 of Example 2 is limited to a range of: −10 um~10 um.

Tables 5, 6 show the lens data of Example 3, wherein F1=−28.0963 mm, F2=33.3390 mm, F3=40.5215, F4=−182.3747 mm, and F5=53.1237 mm.

TABLE 5

| Surface | R(mm) | D(mm) | Nd | V |
|---|---|---|---|---|
| The magnification-side surface of the first lens 11 | 79.997 | 4.758 | 1.6879 | 50.1164 |
| The minification-side surface of the first lens 11 | −4583.001 | 0.353 | — | — |
| The magnification-side surface of the second lens 12 | 60.664 | 1.8 | 1.5382 | 65.5839 |
| The minification-side surface of the second lens 12 | 22.373 | 8.82 | — | — |
| The magnification-side surface of the third lens 13 | −67.588 | 1.8 | 1.6376 | 56.2887 |
| The minification-side surface of the third lens 13 | 31.666 | D6 (see table 6) | — | — |
| The magnification-side surface of the fourth lens 21 | −144.43 | 7 | 1.6885 | 50.0393 |
| The minification-side surface of the fourth lens 21 | −46.511 | 0.17 | — | — |
| The magnification-side surface of the fifth lens 22 | 40.133 | 4.371 | 1.7346 | 34.607 |
| The minification-side surface of the fifth lens 22 | −800.197 | D10 (see table 6) | — | — |
| The surface of aperture stop 95 | infinite | 0.17 | — | — |
| The magnification-side surface of the sixth lens 31 | 35.664 | 3.542 | 1.5362 | 65.747 |
| interface between the sixth lens 31 and the seventh lens 32 | −24.865 | 1.737 | 1.5775 | 42.1955 |

TABLE 5-continued

| Surface | R(mm) | D(mm) | Nd | V |
|---|---|---|---|---|
| The minification-side surface of the seventh lens 32 | −49.067 | D14 (see table 6) | — | — |
| The magnification-side surface of the eighth lens 41 | 295.347 | 1.931 | 1.7544 | 27.6128 |
| The minification-side surface of the eighth lens 41 | 22.836 | 5.871 | — | — |
| The magnification-side surface of the ninth lens 42 | 13.832 | 1.543 | 1.7529 | 29.9514 |
| The interface between the ninth lens 42 and the tenth lens 43 | 57.817 | 7.371 | 1.5779 | 62.747 |
| The minification-side surface of the tenth lens 43 | −18.979 | 0.17 | — | — |
| The magnification-side surface of the eleventh lens 44 | 173.897 | 5.237 | 1.744 | 44.8504 |
| The minification-side surface of the eleventh lens 44 | −41.247 | D21 (see table 6) | — | — |
| The magnification-side surface of the twelfth lens | 42.322 | 5.064 | 1.744 | 44.8504 |
| The minification-side surface of the twelfth lens | −610.59 | 4.028 | — | — |
| Magnification-side surface of the PBS prism 96 | infinite | 23 | 1.5168 | 64.1673 |
| Minification-side surface of the PBS prism 96 | infinite | 4 | — | — |
| Magnification-side surface of the halfwave plate 97 | infinite | 0.5 | 1.523014 | 58.5876 |
| Minification-side surface of the halfwave plate 97 | infinite | 1 | — | — |
| Magnification-side surface of the polarizer 98 | infinite | 2.2 | 1.5168 | 64.1673 |
| Minification-side surface of the polarizer 98 | infinite | 1 | — | — |
| The surface 99 | infinite | — | — | — |

TABLE 6

| Lens state | F (mm) | $F_{No}$ | 2ω | D1 (mm) | D2 (mm) | D3 (mm) | D4 (mm) |
|---|---|---|---|---|---|---|---|
| Wide angle state | 20.05 | 1.84 | 54.22° | 13.567 | 15.678 | 0.21 | 0.2 |
| Telephoto state | 24.06 | 2.09 | 45.71° | 7.962 | 13.76 | 3.281 | 3.576 |

As illustrated in FIGS. 19~26, spherical aberration occurring in the zoom lens 100 of Example 3 is limited to be in a range of: −0.2 mm~0.2 mm, field curvature occurring in the zoom lens 100 of Example 3 is limited to a range of: −0.15 mm~0.15 mm, distortion occurring in the zoom lens 100 of Example 3 is limited to be within the range of: −5%~5%, lateral chromatic aberration occurring in the zoom lens 100 of Example 3 is limited to a range of: −10 um~10 um.

In all, in Examples 1~3, aberrations occurring in the zoom lens 100 are controlled/corrected to be at an acceptable level, and changes in aberrations are reduced to acceptable levels as well, over the entire zoom range of the zoom lens 100, accordingly, a high resolution of zoom lens 100 is obtained, and maintained over the entire zooming range of the zoom lens 100.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A zoom lens for use in projection technology comprising, in this order from the magnification side to the minification side thereof, a first lens group having negative refraction of power,
a second lens group having positive refraction of power,
a third lens group having positive refraction of power,
a fourth lens group having negative refraction of power, and
a fifth lens group having positive refraction of power,
wherein the zoom lens satisfies the formulas: $-1.5<F1/Fw<-1.3$, $1.5<F2/Fw<1.8$, $1.8<F3/Fw<2.2$, $-10<F4/Fw<-5$, and $2.3<F5/Fw<2.8$, where F1, F2, F3, F4, F5, and Fw respectively represent the effective focal length of the first lens groups, the second lens group, the third lens group, the fourth lens group, the fifth lens group, and the shortest effective focal length of the zoom lens.

2. The zoom lens as claimed in claim 1, wherein the first lens group and the fifth lens group are immovably mounted, and the second lens group, the third lens group, and the fourth lens group being movably mounted.

3. The zoom lens as claimed in claim 1, further satisfying the formula: $V1>55$, where V1 is the average of Abbe number of the lenses in the first lens group.

4. The zoom lens as claimed in claim 1, wherein the first lens group comprises, in this order from the magnification side to the minification side of the zoom lens, a first lens having positive refraction of power, a second lens having negative refraction of power, and a third lens having negative refraction of power.

5. The zoom lens as claimed in claim 1, wherein the second lens group includes, in this order from the magnification side to the minification side of the zoom lens, a first lens having positive refraction of power, and a second lens having positive refraction of power.

6. The zoom lens as claimed in claim 1, wherein the third lens group includes, in this order from the magnification side to the minification side of the zoom lens, a first lens having positive refraction of power, and a second lens having negative refraction of power.

7. The zoom lens as claimed in claim 6, wherein the first lens and the second lens are attached together.

8. The zoom lens as claimed in claim 1, wherein the fourth lens group includes, in this order from the magnification side to the minification side of the zoom lens, a first lens having negative refraction of power, a second lens having negative refraction of power, a third lens having positive refraction of power, and a fourth lens having positive refraction of power.

9. The zoom lens as claimed in claim 8, wherein the second lens and the third lens are attached together.

10. The zoom lens as claimed in claim 1, wherein the fifth lens group comprises a lens having positive refraction of power.

11. The zoom lens as claimed in claim 1, further comprising an aperture stop, the aperture stop being interposed between the second lens group and the third lens group.

* * * * *